US 12,356,283 B2

(12) United States Patent
Condon

(10) Patent No.: US 12,356,283 B2
(45) Date of Patent: Jul. 8, 2025

(54) WiFi MOTION DETECTING FOR SMART HOME DEVICE CONTROL

(71) Applicant: DISH Network L.L.C., Englewood, CO (US)

(72) Inventor: Caroline Elizabeth Condon, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 237 days.

(21) Appl. No.: 17/891,830

(22) Filed: Aug. 19, 2022

(65) Prior Publication Data

US 2024/0064489 A1    Feb. 22, 2024

(51) Int. Cl.
*H04W 4/02* (2018.01)
*H04W 24/08* (2009.01)

(52) U.S. Cl.
CPC ........... *H04W 4/027* (2013.01); *H04W 24/08* (2013.01)

(58) Field of Classification Search
CPC .............................. H04W 4/027; H04W 24/08
See application file for complete search history.

(56) References Cited

U.S. PATENT DOCUMENTS

| | | | |
|---|---|---|---|
| 11,102,637 B2 | 8/2021 | Beemer et al. | |
| 11,157,086 B2 * | 10/2021 | Cipoletta | H04W 4/021 |
| 11,930,380 B2 * | 3/2024 | Sakamoto | H04L 43/50 |
| 2015/0327010 A1 * | 11/2015 | Gottschalk | G05B 15/02 |
| | | | 455/456.1 |
| 2016/0302079 A1 * | 10/2016 | Chari | H04W 24/08 |
| 2017/0032632 A1 | 2/2017 | Joseph et al. | |
| 2017/0109981 A1 | 4/2017 | Joseph et al. | |
| 2017/0270481 A1 | 9/2017 | Morgenthau et al. | |
| 2018/0143601 A1 | 5/2018 | Chavan et al. | |
| 2018/0365785 A1 | 12/2018 | Boss et al. | |
| 2019/0102488 A1 | 4/2019 | Santarone et al. | |
| 2020/0202117 A1 * | 6/2020 | Wu | G06F 21/32 |
| 2021/0352462 A1 | 11/2021 | Beemer et al. | |

OTHER PUBLICATIONS

U.S. Appl. No. 17/953,614, Notice of Allowance, Mar. 30, 2023.

(Continued)

*Primary Examiner* — David Bilodeau
(74) *Attorney, Agent, or Firm* — Wash Park IP Ltd.; John T. Kennedy

(57) ABSTRACT

A process for detecting motion within an environment includes receiving, at a monitor, first coupling data for a coupling of a first node with a second node. The first node is coupled to the second node which is further coupled to the monitor and thereby form a mesh network. The operations may include: at the monitor, receiving first node identifying data, selecting a first median for a first signal property for a first wireless coupling, monitoring the first signal property, determining, upon detecting a change in the first signal property, whether the first signal property exceeds the first median, determining, when the first signal property exceeds the first median, if the change in the first signal property exceeds a first threshold, initiating a first action when the first threshold is exceeded, and determining whether to resume monitoring of the first signal property when the first threshold is not exceeded.

19 Claims, 9 Drawing Sheets

(56) References Cited

OTHER PUBLICATIONS

U.S. Appl. No. 17/891,830, filed Aug. 19, 2022, Caroline Elizabeth Condon.
U.S. Appl. No. 17/953,614, filed Sep. 27, 2022, Houston Beemer.
"Chapter 7", downloaded from the Internet on Oct. 21, 2020, from http://aturing.umcs.maine.edu/ meadow/courses/cos335/COA07.pdf.
"CSCI 4717", downloaded from the Internet on Oct. 21, 2020 from https://faculty.etsu.edu/tarnoff/ntes4717/week_06/IO.ppt, and converted into PDF form.
"Lecture 19", downloaded from the Internet on Oct. 21, 2020, from http://www.ecs.csun.edu/ cputnam/Comp546/Input-Output-Web.pdf.
U.S. Appl. No. 16/568,019, Full Prosecution History.
U.S. Appl. No. 17/380,223, Full Prosecution History to date.
U.S. Appl. No. 17/380,223, Non-final Office Action, Mar. 2, 2023.
U.S. Appl. No. 17/877,736, filed Jul. 29, 2022.
U.S. Appl. No. 17/891,830, filed, Aug. 19, 2022.
U.S. Appl. No. 17/953,614, filed Sep. 27, 2022.
U.S. Appl. No. 17/953,614, non-final Office Action, Mar. 2, 2023.
U.S. Appl. No. 17/953,614, response to non-final Office Action and e-Terminal Disclaimer, Mar. 10, 2023.
"Choosing Your Motion Detection Devices—Plume Help," Plume Inc. 2022, downloaded from the Internet on May 4, 2022 from https://support.plume.com/hc/en-us/articles/360043393453-Choosing-your-Motion-Detection-Devices-.
"What devices are eligible or detecting motion?" Plume Design Inc., 2022, as downloaded from the Internet on May 4, 2022 from https://support.plume.com/hc/en-us/articles/360043364893-What-devices-are-eligible-for-detecting-motion.
"What is Sense?" Plume Design Inc., 2022, as downloaded from the Internet on May 4, 2022 from https://support.plume/com/hc/en-us/articles/360042635193-What-is-Sense-.
"Why is there no Sense coverage in a room where I have a Wi-Fi connection?" Plume Design Inc., 2022, as downloaded from the Internet on May 4, 2022 from https://support.plume.com/hc/en-us/articles/360043658413-why-is-there-no-Sense-coverage-in-a-room-where-I-have-a-wi-fi-connection-.
Delaney, John R., PC Magazine, Jul. 27, 2021, "Plume SuperPod With Wi-Fi 6 Review," as downloaded from the Internet on May 4, 2022 from: https://www.pcmag.com/reviews/plume-superpod-with-wi-fi-6.
HomePass, "How do I access my home's motion history?", Plume Design Inc., as downloaded from the Internet on May 4, 2022 from https://support.plume/com/hc/en-us/articles/360042906154.
Salter, Jim, Mar. 3, 2020, "From Wi-Fi to Spy-Fi—we test Plume's new motion detection featue lArs Technica," as downloaded from the Internet on May 4, 2022 from https://artechnica.com/gadgets/2022/03/from-wi-fi-to-spy-fi-we-test-plumes-new-motion-detection-feature/.
U.S. Appl. No. 17/877,736, filed Jun. 3, 2022.
U.S. Appl. No. 17/877,736, Non-final Office Action, Jan. 27, 2025 (Available at USPTO Patent Center).
U.S. Appl. No. 17/877,736, Non-final Office Action Response, Apr. 19, 2025.

\* cited by examiner

WiFi MOTION DETECTING FOR SMART HOME DEVICE CONTROL

TECHNICAL FIELD

The technology described herein generally relates to devices, systems, and processes for detecting motion and the location of such motion in a given environment and controlling one or more related devices within the given environment.

BACKGROUND

Systems, devices and methods for detecting motion and location of such motion in a given environment, such as a home, retail establishment, or office commonly utilizes one or more of optical technologies (such as Infra-Red (IR), laser, image change recognition technologies, and the like), audible technologies (such as sound change detections), air pressure changes, vibration sensors (e.g., those on windows and doors), magnetic or other switch sensors (e.g., those on doors and windows), or the like. Use of such technologies often incur installation and use costs that can be prohibitive. For example, optical motion detection technologies are commonly limited to a given field of view, over a given range, and under a given set of operating conditions. Installing and operating optical motion detection technologies for a home environment, for example, often involves use of multiple cameras and detectors, wiring thereto, and the like. Numerous cameras are often used to cover multiple means of egress into/out of a home, areas inside and outside of a home, and the like. Similarly, magnetic, and other switch based sensors are commonly used with accessible doors and windows for a home. Installing, operating and maintaining such a system can also be costly as cameras and sensors often degrade and/or fail over time, and the like.

Recently, Plume Design Inc., has provided their HOMEPASS™ products and services. HOMEPASS includes a feature marketed under the SENSE trademark that utilizes changes in Wi-Fi signals between a "SuperPod" and up to three "motion detectable capable devices" connected to a SuperPod (see https://support.plume.com/hc/en-us/articles/360043393453-Choosing-your-Motion-Detection-Devices-) (a copy of which is provided in and Information Disclosure Statement filing submitted herewith. Such a system is often limited to direct connections between a "SuperPod" and another Wi-Fi compatible device. Accordingly, motion detection and motion location identification systems are needed.

The various implementations and implementations described herein provide devices, systems and processes which address the above and other concerns.

SUMMARY

The various implementations described herein provide devices, systems, and processes for detecting motion within a given environment based upon changes in wireless signal strength characteristics between two or more nodes of a mesh network. Various implementations described herein may also provide devices, systems, and processes for identifying location of detected motions within a given environment based upon changes in wireless signal strength characteristics between multiple nodes of a mesh network.

In accordance with at least one implementation of the present disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a process for detecting motion within an environment. The process may include receiving, at a monitor, first coupling data for a first wireless coupling of a first node with a second node. The first node may be coupled to the second node and the second node may be coupled to the monitor. The first node, the second node and the monitor form a mesh network.

The process may include receiving, at the monitor, first node identifying data for the first node, selecting, at the monitor, a first median for a first signal property for a first wireless coupling, monitoring the first signal property; determining, upon detecting a change in the first signal property, whether the first signal property exceeds the first median. The process may also include determining, when the first signal property exceeds the first median if the change in the first signal property exceeds a first threshold and initiating a first action when the first threshold is exceeded. The process may also include determining whether to resume monitoring of the first signal property when the first threshold is not exceeded. Other implementations may include corresponding computer systems, apparatus, and computer programs recorded on one or more computer storage devices configured to perform the actions of the process.

Implementations may include one or more of the following features. The first node may identify data that identifies a capability of the first node. The first node may be a smart device. The first signal property may be a signal strength for the first wireless coupling. The first median for the first signal property may be selected by retrieving the first median from a data store storing a plurality of past readings for the first signal property. The first median for the first signal property may be determined by monitoring the first wireless coupling over a given period and calculating the first median based upon results of the monitoring. The first signal property may be monitored by the first node and reported to the monitor on any given basis, such as continually. The first threshold may be exceeded based upon a presence of an interfering signal in the environment. The first threshold may be exceeded when the first signal property decreases below the median by more than a given number. The given number may be specified in view of one or more types of locomotory objects within the environment. Types of locomotory objects may include at least one of humans, animals, and robots.

An action may include providing an adaptive environment. A first node may be located within a first confine of an environment and the second node may be located within a first confine of the environment. The first coupling may be an intra-confine coupling. The monitor may be located with a second confine of the environment. The monitor may be coupled to the second node by an inter-confine coupling. The environment may be a home and the first confine may be a room within the home.

For at least one implementation, the process may include determining a location of a locomotory object within the environment. The process may include an operation of receiving changes in a second signal property for at least one second coupling between nodes within the environment. The process may include retrieving one or more first coupling signal planes for the first coupling, retrieving one or more second coupling signal planes for the second coupling, and determining whether any of the retrieved first coupling signal planes intersect the retrieved second coupling signal planes. When at least one of one or more retrieved first coupling signal planes intersect with at least one of the one or more retrieved second coupling signal planes, the process may include selecting a first coupling signal plane from the one or more intersecting first coupling signal planes, selecting a second coupling signal plane from the one or more intersecting second coupling signal planes, determining an intersection between the as selected first coupling signal plane and the as selected second coupling signal plane, and identifying the intersection as a location of a locomotory object.

An intersection may be a two-dimensional space within an environment. An environment may include a third coupling between one of: the first node and a third node; the second node and the third node; the first node and the monitor; and the third node and the monitor.

The process may include retrieving one or more third coupling signal planes for the third coupling and determining whether any of the first coupling signal planes or second coupling signal planes intersect with the third coupling signal planes. When at least one of one or more first coupling signal planes or second coupling signal planes intersect with at least one of the one or more third coupling signal planes, the process may include selecting a third coupling signal plane from the one or more intersecting third coupling signal planes; determining a second intersection between the, as selected, first coupling signal plane, the, as selected, second coupling signal plane, and the, as selected, third coupling signal plane; and identifying the second intersection as a second location of the locomotory object. The second location may be defined in terms of a three-dimensional space and within the environment. The monitor initiates an action based on at least one of the identifying of the first intersection and the second intersection. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1A:
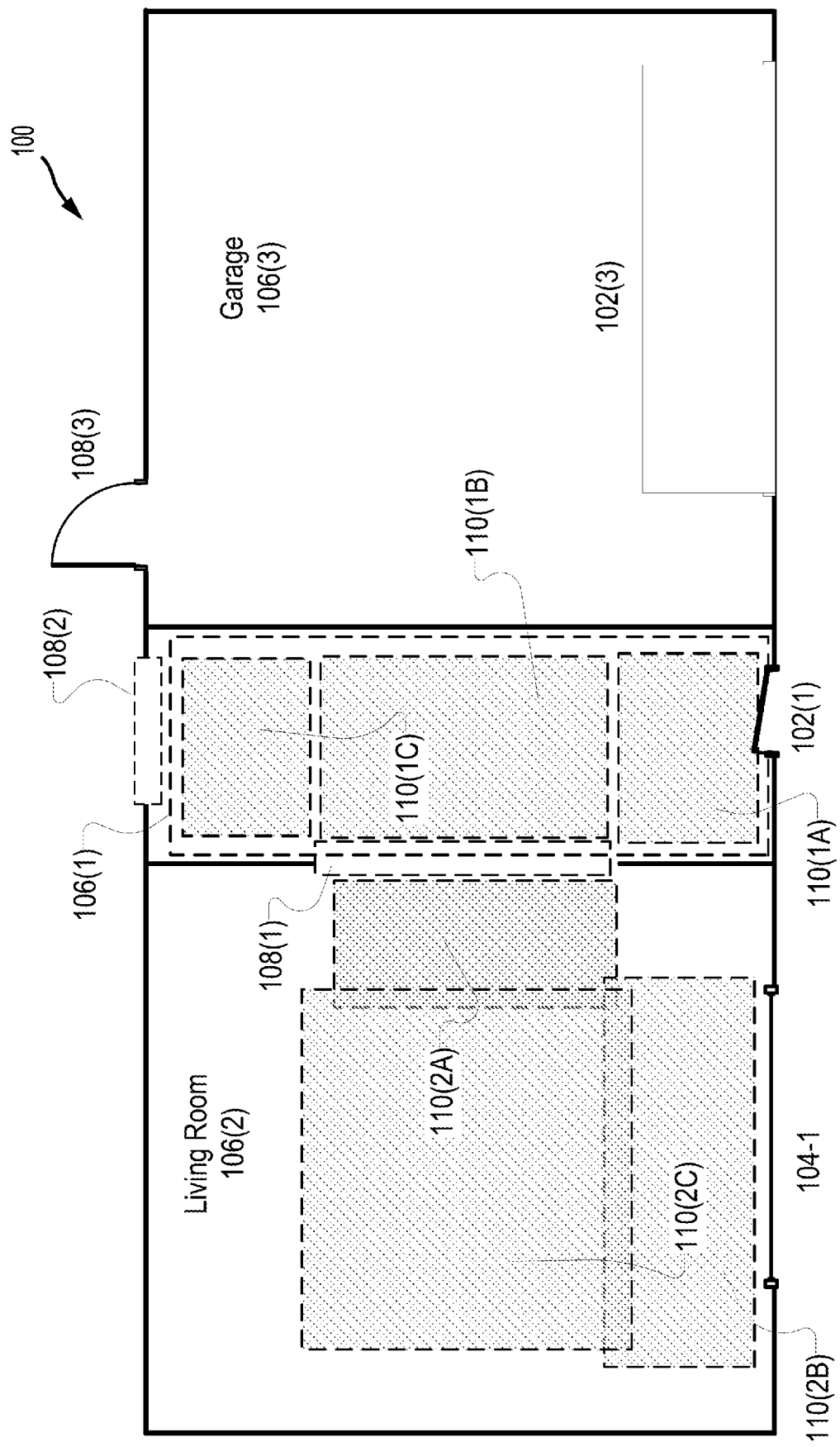
FIGS. 1A-1E are schematic representations of a system for detecting motion and, optionally, the location of such motion within a given environment and in accordance with at least one implementation of the present disclosure.

Various implementations of the present disclosure describe devices, systems, and processes for detecting motion within a given environment based upon changes in signal strength characteristics between one or more nodes of a mesh network.

"Data" (which is also referred to herein as a "computer data" and "data packet(s)") refers to any representation of facts, information or concepts in a form suitable for processing by one or more electronic device processors and which, while and/or upon being processed, cause or result in an electronic device or other device to perform at least one function, task, operation, provide a result, or otherwise. Data may exist in a transient and/or non-transient form, as determined by any given use of the data.

An "Instruction" (which is also referred to herein as a "computer instruction") refers to a non-transient processor executable instruction, associated data structure, sequence of operations, program modules, or the like. An instruction is defined by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

"Processor" refers to one or more known or later developed hardware processors and/or processor systems configured to execute one or more computer instructions, with respect to one or more instances of data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like.

Processors may be implemented in single or parallel or other implementation structures, including distributed, Cloud based, and otherwise.

A "computer engine" (or "engine") refers to a combination of a "processor" (as described below) and "computer instruction(s)" (as defined below). A computer engine executes computer instructions to perform one or more logical operations (herein, a "logic") which facilitate various actual (non-logical) and tangible features and function provided by a system, a device, and/or combinations thereof.

"Substantially simultaneous(ly)" means without incurring a greater than expected and humanly perceptible delay between a first event or condition, such as a presentation of content obtained from one or more first data packets, and a presentation of a second content obtained from one or more second data packets. Substantial simultaneity may vary in a range of quickest to slowest expected delay to longer delay. It is to be appreciated that the subject and acceptable threshold of "substantial simultaneity" is also distance, data processing, and data communication capabilities dependent. For example, content provided in data packets over gigabit Ethernet capable local area network (LAN) connections may have a shorter acceptable delay period (and a more stringent substantially simultaneous requirement) than content presented over a 3G network, where data communications are knowingly slower and thus a given (longer) delay period may satisfy a subject substantially simultaneous threshold.

"Cloud" refers to cloud computing, cloud storage, cloud communications, and/or other technology resources which a given user does not actively manage or provide. A usage of a Cloud resource may be private (limited to certain users and/or uses), public (available for many users and/or uses), hybrid, dedicated, non-dedicated, or otherwise. It is to be appreciated that implementations of the present disclosure may use Cloud resources to provide for processing, storage and other functions related to facilitating live cell phone watch parties.

"Module" recites definite structure for an electrical/electronic device that is configured to provide at least one feature and/or output signal and/or perform at least one function including the features, output signals and functions described herein. Such a module may provide the one or more functions using computer engines, processors, computer instructions and the like. When a feature, output signal and/or function is provided, in whole or in part, using a processor, one more software components may be used and a given module may be include a processor configured to execute computer instructions. A person of ordinary skill in the art (a "POSITA") will appreciate that the specific hardware and/or computer instructions used for a given implementation will depend upon the functions to be accomplished by a given module. Likewise, a PHOSITA will appreciate that such computer instructions may be provided in firmware, as embedded software, provided in a remote and/or local data store, accessed from other sources on an a given basis, or otherwise. Any known or later arising technologies may be used to provide a given module and the features and functions supported therein.

Homes, offices, retail establishments, stadiums, parks, yards, and the like (herein, an "environment") often include mesh networks which provide wired and wireless connectivity between two or more electronic devices therein. In a mesh network, electronic devices (herein, "nodes", as further described below) may be connected directly, dynamically, and non-hierarchically with other devices and/or with routers, gateways, switches, and the like (herein, "routers") to at least one "monitor" (as described below) which facilitate "monitoring services" (as described below) of the given environment for purposes of at least motion detection, motion location identification. The monitor may also provide other services, such as node control and configuration, and otherwise. Individually and collectively, the nodes and routers facilitate the exchange of data within the environment and/or with locations external to the environment, with the monitor(s).

Herein, a "node" is an electronic device, configured for use in a mesh network, which performs one or more "networked functions." Non-limiting examples of nodes include: "computing devices," such as laptop computers, personal computers, tablet computing devices, desktop computers, smartphones, smartwatches, and the like; "smart devices," such as smart thermostats, smart light bulbs, smart alarm systems, smart doorbells, smart locks, smart appliances, such as refrigerators, ovens, coffee makers; and any other device capable of wirelessly communicating with another node or router on a given mesh network. A "networked function" includes any function that a computing device, a smart device, or another networked device can perform. For a non-limiting example, a networked function of a smart device may include turning on or off of one or more lamps, raising/lowering blinds, changing temperature settings of a thermostat, or the like. A node may be configured to operate independently (e.g., raise blinds when daylight is detected) and/or based upon instructions and data received from a monitor connected thereto. A node may be connected to a monitor by a wired or wireless coupling directly, or indirectly (e.g., via a router and/or one or more other nodes connected by a router to a "monitor").

Herein, a "monitor" is a computing device, such as a server, which facilitates monitoring services. Non-limiting examples of monitors include those provided by CONTROL4™, Apple HomeKit™, Google NEST™, Philips HUE™, CRESTRON™, LOREX™, ADT™, and others. A monitor may be located within one or more actual and/or virtualized processors provided within a given environment and/or external to a given environment, such as a web server, a Cellular server, or otherwise. Devices may be coupled to a monitor using any known or later arising wireless coupling technologies.

Herein, a "monitoring service" is any currently available and/or future arising service which facilitates access, control, detection, monitoring, use, configuration or otherwise of an environment and/or devices within a given environment.

As shown in FIG. 1A and as further shown in FIGS. 1B-1E, an environment 100 may include a structure, an area (e.g., a playground, park, yard, or the like), or any other definable space. An environment 100 may include one or more primary ingress/egress 102 (herein, ingress and egress locations are referred to as an "egress" location), secondary egress 104 (if any), confines 106, and passageways 108 between confines 106. Further, a confine 106 may have one or more definable confine areas 110.

An environment 100 may be a home that includes a primary egress 102 (such as a door). The primary egress 102 may be configured for use by humans, animals (e.g., dog doors), vehicles, or otherwise. For example, primary egresses may include a front door 102(1), a rear door (not shown), and a garage door 102(3). Any number of primary egresses 102 may be provided for an environment 100. For a non-structural implementation, such as a yard associated with a home, an example of a primary egress 102 may include a gate to the yard that is enclosed by a fence or the like.

As further shown, an environment 100 may include one or more secondary egress 104, such as one or more windows. For example, secondary egresses may include a living room window 104(1), and a kitchen window (not shown). Any number of secondary egresses 104 may be provided in a given an environment 100. For a non-structure implementation, an example of a secondary egress 104 may include a helicopter landing site, a dock, a zip-line, or the like.

As further shown, an environment 100 may include one or more confines 106, such as one or more rooms in a home or areas of a park (e.g., playgrounds, ball fields, or the like). For the non-limiting example shown in FIG. 1A, confines 106 may include a hall 106(1), a living room 106(2), a kitchen (not shown), a garage 106(3), and other rooms (not shown).

A confine 106 may include one or more confine areas 110. The one or more areas 110 may be defined in terms of actual, physical locations within a confine 106. Such definitions may be fixed and/or variable. For example, a confine area 110 may change over time day, during use scenarios (e.g., during home movie experiences), known presence or absence of persons, animals, objects (e.g., cars), or the like, and otherwise. A given confine area 110 may be defined in terms of any given location and/or area definition. Non-limiting examples, including global positioning system (GPS) and similar locations, as portions of a given confine 106, or otherwise.

For example, a hall 106(1), may be physically and/or logically defined in terms of three or more confine areas, such as a first (or entry) hall confine area 110(1A), a second (or central) hall confine area 110(1B), and a third (or exit) hall confine area 110(1C). For this non-limiting example, the first hall confine area 110(1A) may be logically associated with the front door 102(1), the third hall confine area 110(1C) may be logically associated with a second passageway 108(2), and the second hall confine area 110(1B) may be logically associated with portions of the hall 106(1) that exist between the first hall confine area 110(1A) and the third hall confine area 110(1C).

Similarly, a living room 106(2) may be logically subdivided into multiple confine areas, such as a first confine area 110(2A), which may be further associated with the first passageway 108(1), a second confine area 110(2B), which may be associated with the living room window 104(1), and a third confine area 110(2C), which may be associated with a central area of the living room 106(2). As shown, one or more of the confine areas 110 may overlap, in part, with other confine areas. Other confine areas may be logically defined for other confines 106 of a given environment 100.

One or more passageways 108 may physically connect one or more confines 106 within an environment 100. For example, a first passageway 108(1) may connect the hall with the living room 106(2), a second passageway 108(2) may connect the hall 106(1) with other rooms, such as a kitchen (not shown), a third passageway 108(3) may connect the garage 106(3) with other rooms, and the like.

A passageway 108 may have any architectural form or structure including doors, portals, windows, openings, stairs, escalators, elevators, or the like. For non-structural implementations, non-limiting examples of passageways 108 may include a walking path, a trail, a driveway, or otherwise.

Figure 1B:
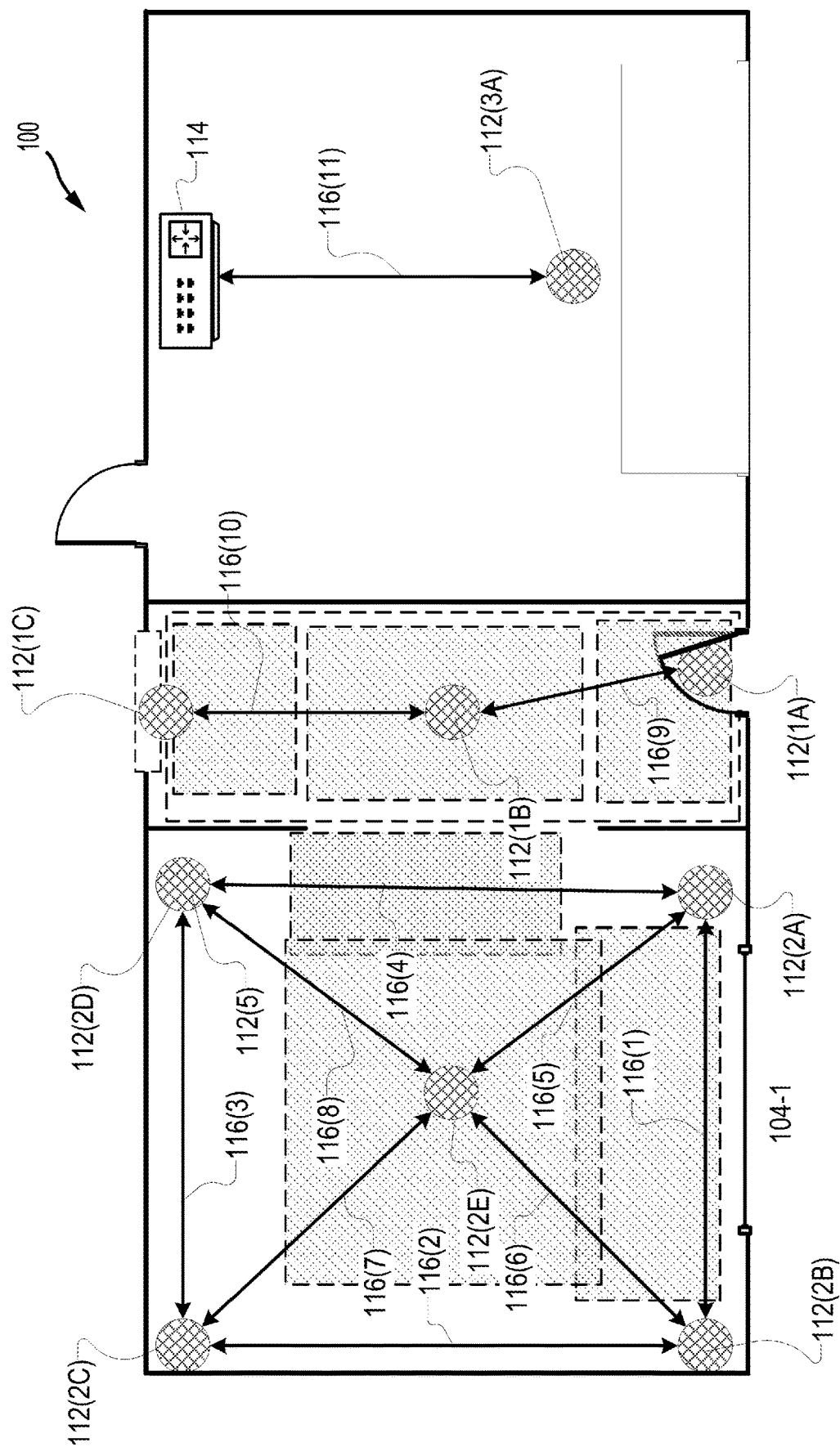

As shown in FIG. 1B, two or more node(s) 112 may be located within an environment 100. For a non-limiting example, a first living room node 112(2A) (e.g., a blinds controller), a second living room node 112(2B) (e.g., a smart lamp), a third living room node 112(2C) (e.g., a smart light switch), a fourth living room node 112(2D) (e.g., a smart audio/video (A/V) device), and a fifth living room node 112(2E) (e.g., a smart ceiling fan).

The environment 100 may include a monitor 114. The monitor 114 may be located at any given location within the environment 100 or remote to the environment, such as web server. When remotely located, the monitor 114 may be coupled thereto by a node 112 that is configured to operate as a network gateway, modem, router, switch and/or the like. Such devices are well known in the art and any currently available or later arising such devices may be utilized.

The two or more nodes 112 may be wirelessly coupled by at least one intra-confine coupling 116 to form a wireless network. Herein, a coupling between node within a given confine, such as a living room 106(2), are referred to as being an "intra-confine coupling." For example, a first intra-confine coupling 116(1) may directly couple the first living room node 112(2A) with the second living room node 112(2B). Similarly, a second intra-confine coupling 116(2) may couple the second living room node 112(2B) with the third living room node 112(2C). A third intra-confine coupling 116(3) may directly couple the third living room node 112(2C) with the fourth living room node 112(2D). A fourth intra-confine coupling 116(4) may directly couple the fourth living room node 112(2D) with the first living room node 112(2A). A fifth intra-confine coupling 116(5) may directly couple the first living room node 112(2A) with the fifth living room node 112(2E). A sixth intra-confine coupling 116(6) may directly couple the second living room node 112(2B) with the fifth living room node 112(2E). A seventh intra-confine coupling 116(7) may directly couple the third living room node 112(2C) with the fifth living room node 112(2E). An eighth intra-confine coupling 116(8) may directly couple the fourth living room node with the fifth living room node 112(2E).

As further shown in FIG. 1B, intra-confine couplings may include a ninth intra-confine coupling 116(9) between the first hall node 112(1A) and the second hall node 112(1B); a tenth intra-confine coupling 116(10) between the second hall node 112(1B) and the third hall node 112(1C); and an eleventh intra-confine coupling 116(11) between the garage node 112(3A) and a monitor 114.

Figure 1C:
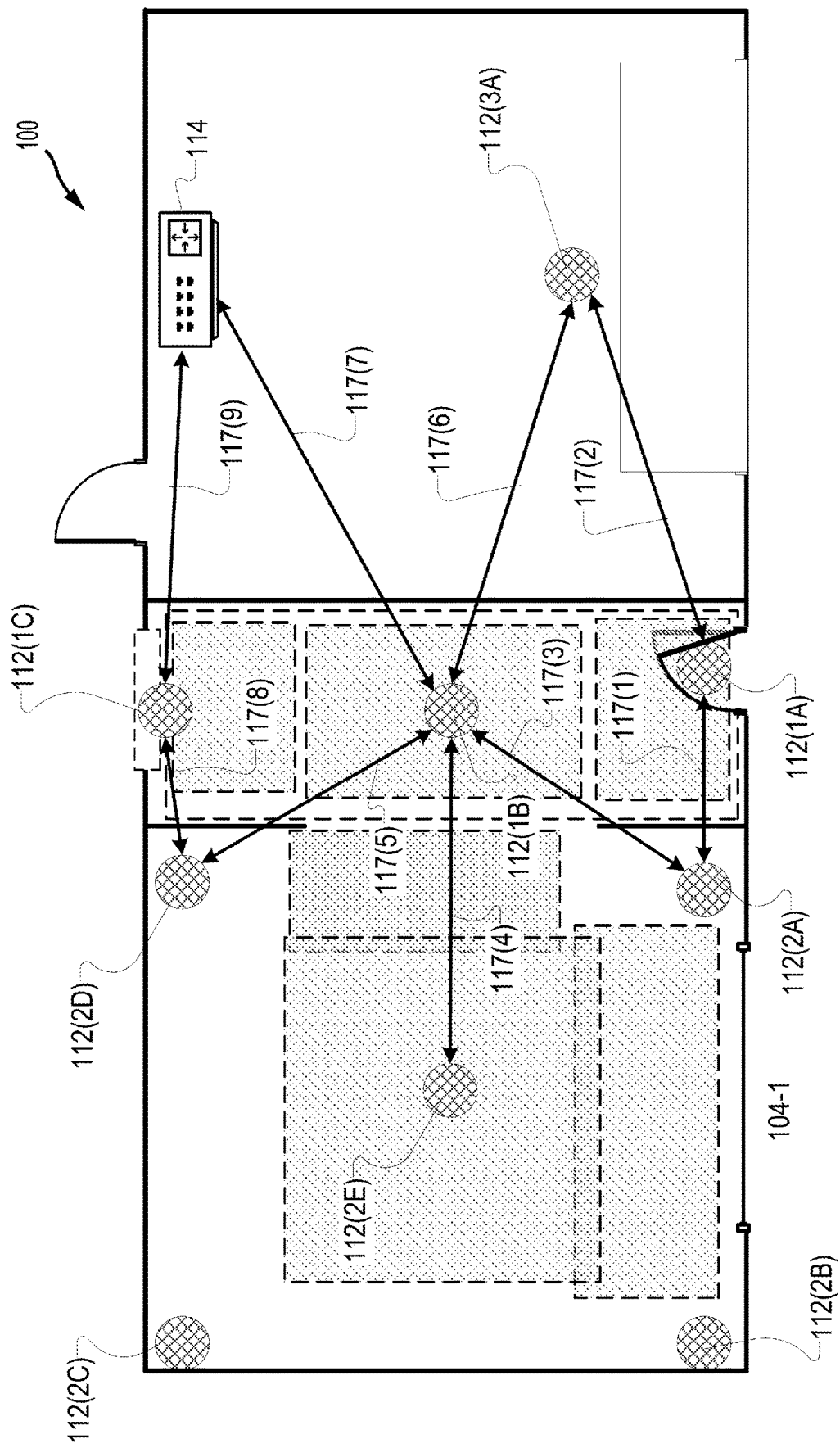

As shown in FIG. 1C, nodes in different confines may be coupled to nodes in other confines. Herein, a coupling between two nodes in different confines is referred to as an "inter-confine coupling." Of note, in FIG. 1C, the intra-confine couplings shown in FIG. 1B, are not shown for purposes of drawing figure simplicity and clarity. For example, the first hall node 112(1A) may be respectively coupled to a first living room node 112(2A) and the garage node 112(3A) by a first inter-confine coupling 117(1) and by a second inter-confine coupling 117(2). The second hall node 112(1B) may be respectively coupled by a third inter-confine coupling 117(3), a fourth inter-confine coupling 117(4), a fifth inter-confine coupling 117(5), a sixth inter-confine coupling 117(6), and a seventh inter-confine coupling 117(7) to the first living room node 112(2A), the fourth living room node 112(2D), the fifth living room node 112(2E), the garage node 112(3A), and the monitor 114. Further, the third hall node 112(1C) may be respectively coupled to the fourth living room node 112(2D) and the monitor 114 by an eighth inter-confine coupling 117(8) and a ninth inter-confine coupling 117(9).

When three or more nodes 112 are used and three or more intra-confine and/or inter-confine couplings 117 are utilized therebetween, a wireless mesh network may be formed within the environment 100. It is to be appreciated that a wireless mesh network may include use of intermediary nodes to couple two or more other nodes. For example, the second living room node 112(2B) may be indirectly coupled to the third living room node 112(2C) via the fifth living room node 112(2E), with the fifth living room node 112(2E) operates as an intermediary and/or "pass-through" device.

Nodes 112 in different confines 106 and/or in different confine areas 110 may be coupled by direct and/or indirect couplings. For an implementation, a node 112 may be located at any given location within the environment 100 at any given time and may be coupled to one or more other nodes and/or the monitor 114 directly and/or indirectly by one or more intra-confine couplings 116 and/or inter-confine couplings 117. A node 112 may be fixed or mobile. For example, a node 112 might include an iROBOT™ device or the like that moves within and between confines 106 and confine areas 110.

Figure 1D:
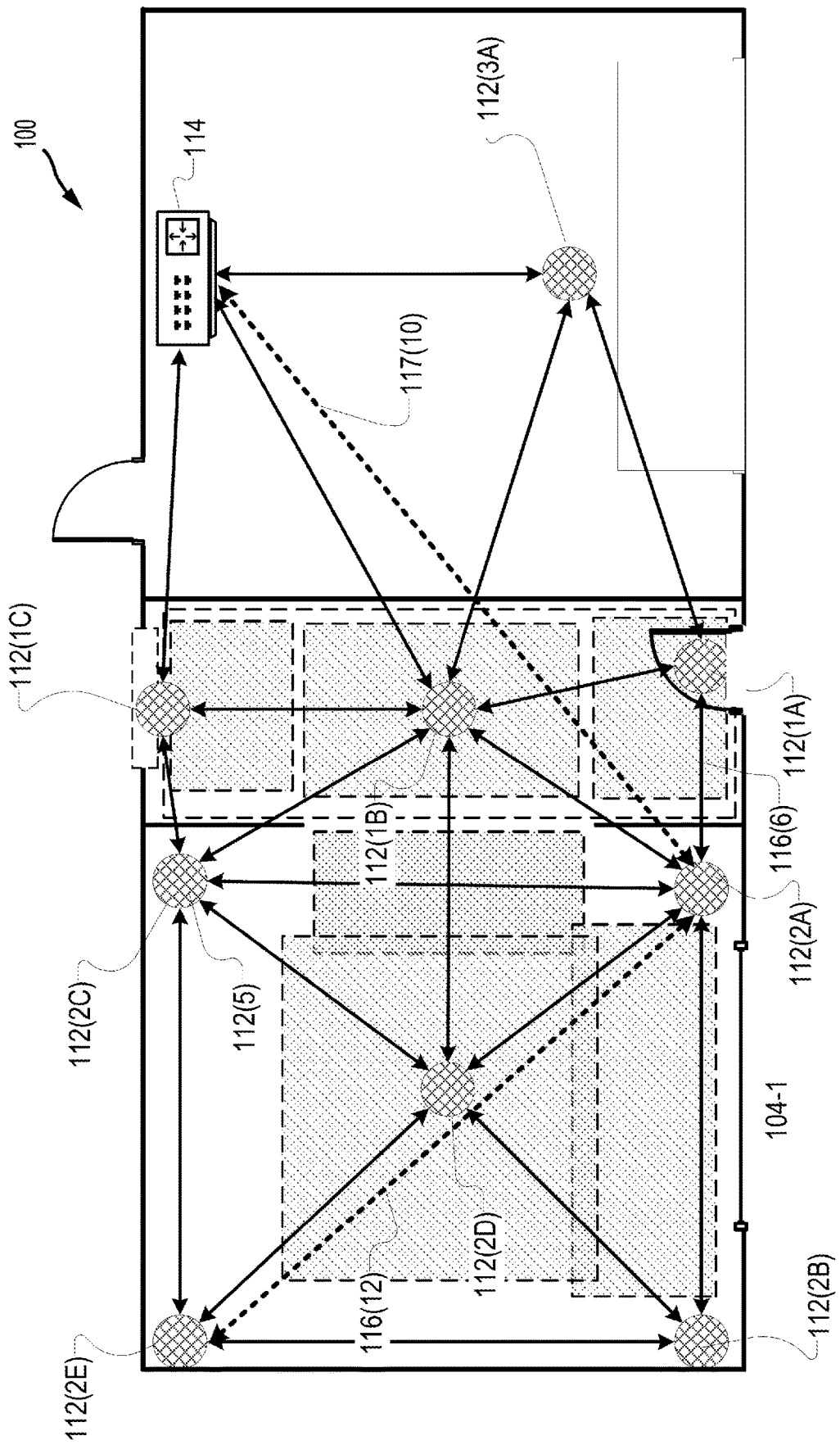

In FIG. 1D, the intra-confine couplings, as illustrated in FIG. 1B, and the inter-confine couplings, as illustrated in FIG. 1C, are jointly illustrated. In FIG. 1D, labels for these couplings are not provided for purposes of drawing figure clarity. For at least one implementation, intra-confine and/or inter-confine couplings may be used between any two nodes 112 within wireless signal range. For example, a twelfth intra-confine coupling 116(12) between the first living room node 112(2A) and the third living room node 112(2C) may occur and a tenth inter-confine coupling 117(10) between the first living room node 112(2A) and the monitor 114 may occur. Such couplings are illustrated by respective dotted lines for purposes of illustrative clarity. It is to be appreciated that an effective range of a given wireless signal used in an implementation of the present disclosure to couple two nodes 112 will vary based on various factors, such as transmission power, receiver sensitivity, wavelength utilized, and the like. Accordingly, implementations may be adaptive for use in a given environment to use one or more intra-confine couplings and/or inter-confine couplings between nodes which facilitate wireless motion detection and location determination within a given wireless signal range.

Herein, "coupling" refers to establishment of a communications link between two or more nodes 112 and/or with a monitor 114. A coupling may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, BLUETOOTH™, Near Field Communications (NFC), ZIGBEE, and others.

To facilitate intra-confine couplings 116 and inter-confine couplings 117, nodes 112 and monitor(s) 114 may use any known or later arising communication components, where non-limiting examples of communications components include encryption components, decryption components, data security components, data storage and warehousing components, transmitters, receivers, antenna, signal processors, amplifiers, signal to noise processors, filters and otherwise.

For at least one implementation, a node 112 is configured to monitor at least one "signal property" of a given intra-confine coupling 116 with another node 112 or a monitor 114 and/or an inter-confine coupling 117 with another node 112 or the monitor 114. As used herein, a "signal property" is a determinable characteristic of a wireless coupling with non-limiting examples include received signal strength, latency, signal to noise ratio, and the like. Based upon changes of a signal property for a given coupling, motion may be detected within a given confine and within a given confine area.

As used herein, a node 112 is further configured to report to a monitor 114, using one or more intra-confine couplings 116 and/or inter-confine couplings 117, the monitored signal property. Such reporting may occur on one or more of: a periodic basis; when changes in the one or more signal properties are detected; when changes in a signal property are not within a given range, exceed a given threshold, or the like; when queried by a monitor 114; or otherwise. Any basis for reporting may be used for an implementation of the present disclosure.

Various forms of objects, such as a person, an animal, a vehicle, a drone, or other movable object may be located and or move, at various times, within one or more confines 106 and/or confine areas 110. For example, (as shown in FIG. 1A) a door for a primary egress 102, such as a front door 102(1), may move from a closed position to an open position (as shown in FIG. 1B, 1C). Such door movement may occur based upon a person opening the door, wind gusts, or otherwise. As the position of the door changes, one or more signal properties of a given coupling may be modified. For example, signal properties of one or more of the sixth intra-confine coupling 116(6), the seventh intra-confine coupling 116(7), and the ninth intra-confine coupling 116(9) may be modified. Based on the sensitivity of one or more of the first hall node 112(1A), the second hall node 112(1B), the first living room node 112(2A), and/or the garage node 112(3A) to changes in signal properties of the respective couplings, the changes in the door's movement may be detected as a motion event.

Figure 1E:
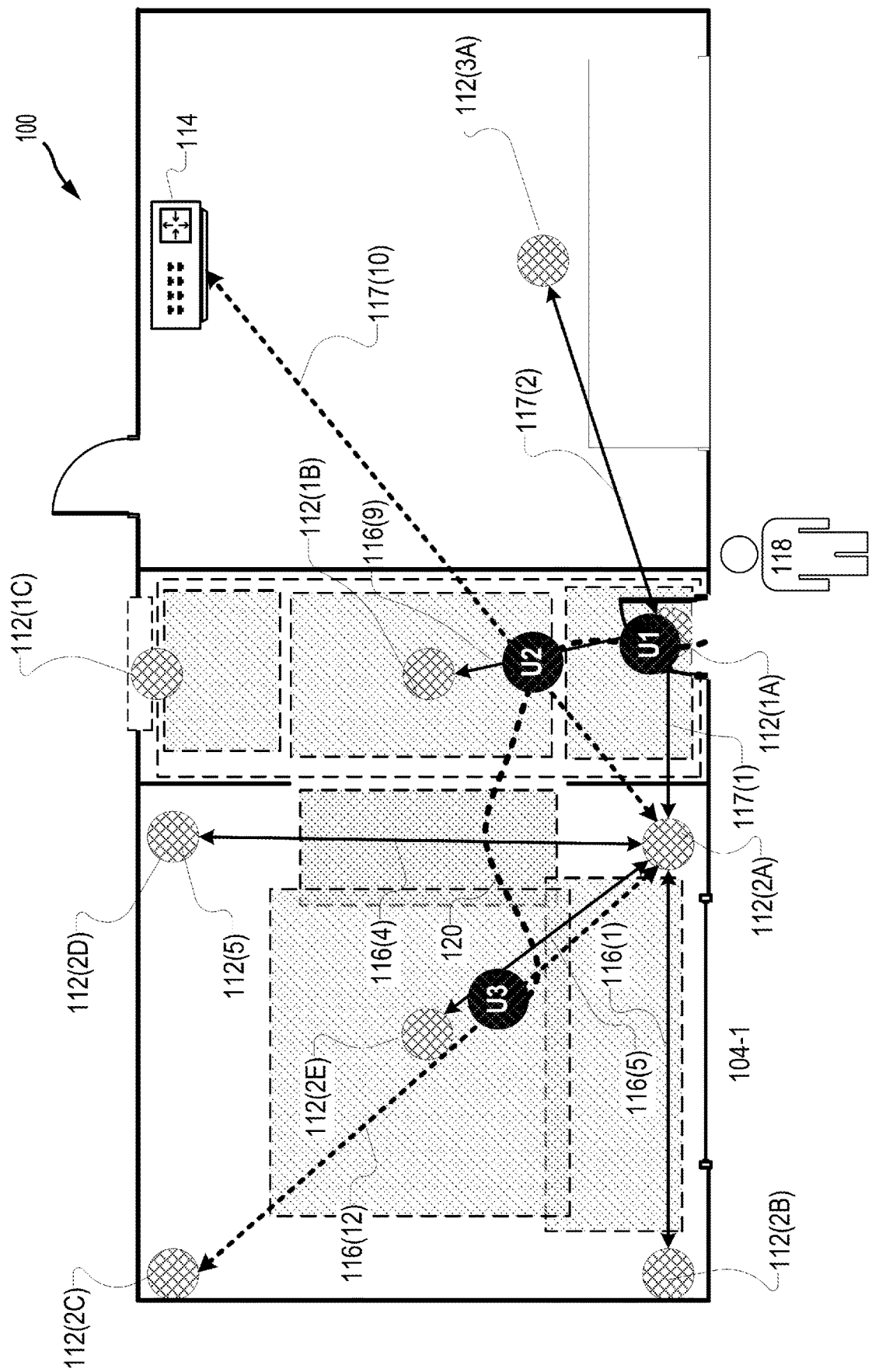

As shown in FIG. 1E, a locomotory object 118, such as a person, animal, or the like may move from a first location U1, to a second location U2, and to a third location U3, as illustrated by a path 120. As the locomotory object 118 moves along the path 120, the locomotory object 118 may traverse one or more intra-confine couplings 116, such as the ninth intra-confine coupling 116(9), the fourth intra-confine coupling 116(4), and fifth intra-confine coupling 116(5), and the twelfth intra-confine coupling 116(12). While moving along the path 120, the locomotory object 118 may also traverse one or more inter-confine couplings 117, such as the second inter-confine coupling 117(2), and the tenth inter-confine coupling 117(10). Of note, in FIG. 1E, various other intra-confine and/or inter-confine couplings that may be used in a given implementation are not shown for purposes of drawing clarity and simplification.

When the locomotory object 118 is a water based organism, such as a human or an animal, one or more signal properties of the intra-confine couplings 116 and inter-confine couplings 117 may be modified. Such modification of such signal properties may be detected by one or more of the nodes 112 and/or monitor 114 associated with a given coupling. Modification of signal properties for the coupling may be detected by different nodes 112 and/or the monitor 114 at various times while the locomotory object 118 moves along the path 120.

Modification of the signal properties for a given coupling may also vary based upon a given location of the locomotory object 118 relative to one or more of the nodes 112 whose coupling(s) are traversed, in whole or in part, by the locomotory object 118. For example, while the locomotory object 118 moves from location U1 to location U2, modifications of the signal properties of the second inter-confine coupling 117(2) initially increase while the locomotory object is near location U1 and may decrease as the locomotory object 118 approaches location U2.

For at least one implementation, a node 112 may be configured to communicate to the monitor 114 changes in signal properties for one or more couplings 116/117 associated with the given node 112. The monitor 114 may be configured to detect changes in such signal properties for the one or more intra-confine couplings 116 reported to the monitor 114 by one or more nodes 112. Changes in signal properties exceeding a given threshold may be used by the monitor 114 to detect motion within a given confine 106 and/or confine area 110. The given threshold may be fixed, predetermined, variable, determined based on historical data arising from movements of one or more locomotory objects 118 through an environment, or otherwise.

It is to be appreciated that a coupling between two or more nodes may be unidirectional, simplex, duplex, multi-directional, or otherwise. Further, signal processing capabilities of nodes 112 and the monitor 114 may vary with one or more nodes 112 and/or the monitor 114 having greater and/or lesser signal processing capabilities than another element of a system used in a given environment. For example, changes in signal properties sensed by a given node for a given coupling may vary based upon whether a given node 112 is a receiver or transmitter of a given wireless signal. Environmental and other factors may also affect signal properties of a given coupling.

For at least one implementation, a monitor 114 may be configured to detect motion by a locomotory object 118 based upon changes in signal properties in multiple couplings 116/117, between multiples nodes 112, and/or within a given period—such period may be predetermined, variable, fixed, adaptable, time of day based, or otherwise.

For at least one implementation, a monitor 114 may be configured to determine a location of a locomotory object 118 based upon changes in signal properties reported by at least two nodes 112 and with respect to at least two couplings 116/117. For example, known principles of triangulation may be used to determine a given location of a locomotory object 118, at a given time, based upon changes in signal properties reported by two or more nodes 112 and with respect to two or more couplings 116/117. It is to be appreciated that the precision of location determination may increase with the number of nodes 112 reporting and/or with respect to the number of couplings 116/117 experiencing change(s) in one or more signal properties, the amount or other characteristic of such change(s), and the like. For example, a detected decrease, by the second hall node 112(1B), in received signal strengths for the ninth intra-confine coupling 116(9) and a detected decrease, by the first living room node 112(2A) in received signal strengths for the tenth inter-confine coupling 117(10), as reported to and analyzed by the monitor 114, may indicate the given location of the locomotory object 118 as then arising at location U2. Similarly, reported changes in signal properties for the fifth intra-confine coupling 116(5) and the twelfth intra-confine coupling 116(12) may indicate the location of the locomotory object 118 as occurring somewhere between the first living room node 112(2A) and the fifth living room node 112(2E). The monitor 114 may be configured to more precisely determine the location of the locomotory object 118 based upon differences in the values of changes in the signal properties of the fifth intra-confine coupling 116(5) and twelfth intra-confine coupling 116(12) and based upon known locations of the first living room node 112(2A), third living room node 112(2C) and fifth living room node 112(2C). For example, when the monitor 114 has access to data indicating that the fifth living room node 112(2E) is ceiling mounted and the first and third nodes 112(2A)/112(2C) are located at a given room outlet heights (e.g., at forty-five centimeters (45 cm) above the floor), the monitor 114 may be configured to determine that as the location of the locomotory object 118 moves closer to the fifth living room node 112(2E), changes in the signal properties for the fifth intra-confine coupling 116(5) will decrease from a given signal property, while changes in the signal properties for the twelfth intra-confine coupling 116(12) will remain substantially constant.

Figure 2:
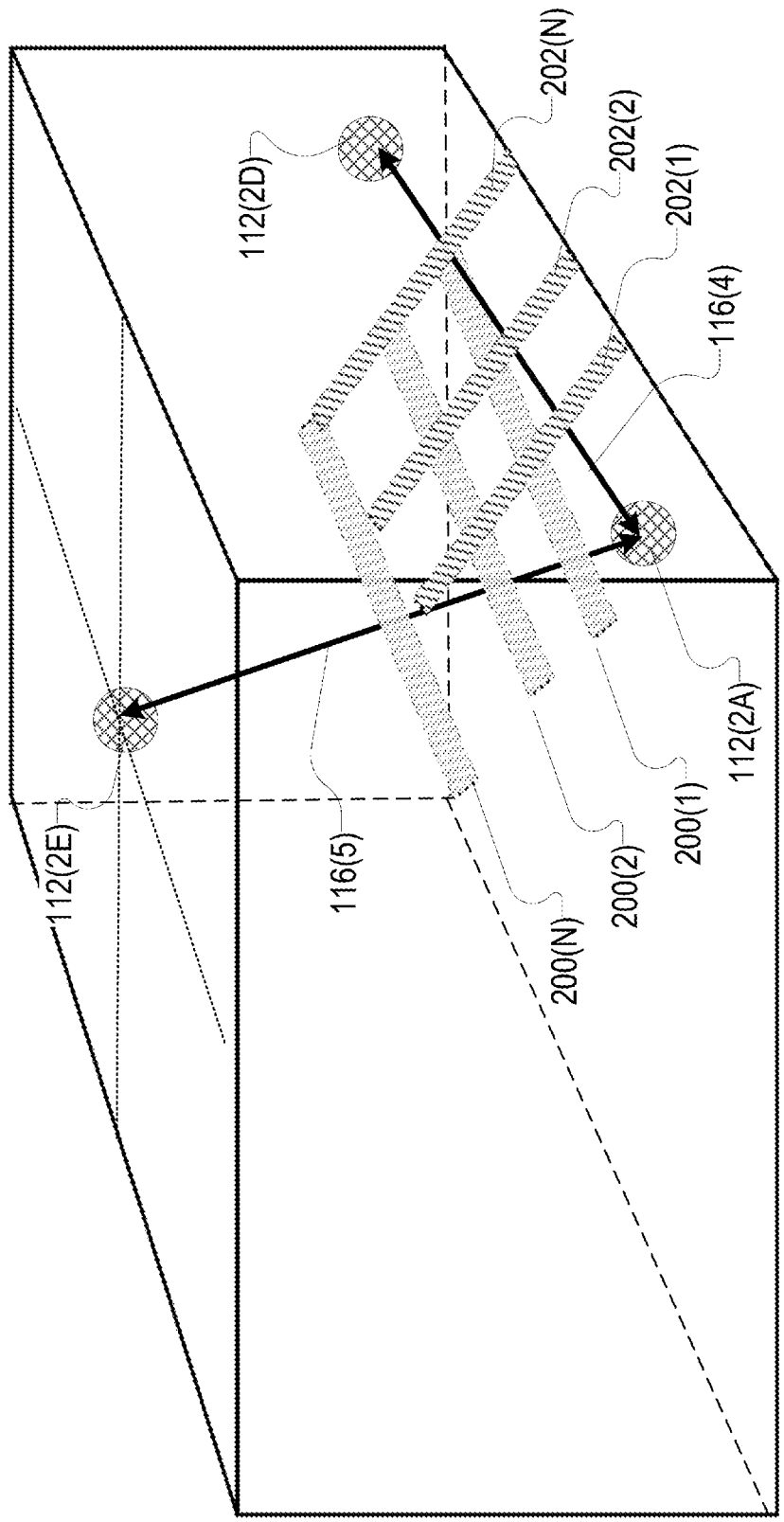
FIG. 2 is an illustration of multiple signal planes used for determining location of a locomotive object based on one or more changes in signal properties between two or nodes within a given environment and in accordance with at least one implementation of the present disclosure.

As shown in FIG. 2 and for at least one implementation, the monitor 114 may be configured to determine locations of a locomotory object 118 based on virtualized intersecting planes, at varying distances from a given node 112 and with respect to a given coupling 116/117. For example, the fifth intra-confine coupling 116(5) may be virtualized to include multiple, 5th intra-confine signal planes 200(1), 200(2) to 200(N) at varying distances from a given node 112 forming the coupling, such as the first living room node 112(2A). The monitor 114 may be configured to associate various changes in signal properties for the fifth intra-confine coupling 116(5), as detected by the first living room node 112(2A), with a given fifth intra-confine signal plane 200. Similarly, the fourth intra-confine coupling 116(4) may be virtualized to include multiple, $4^{th}$ intra-confine signal planes 202(1), 202(2) to 202(N) at varying distances from a given node forming the coupling, such as the first living room node 112(2A). The monitor 114 may be configured to associate various changes in signal properties for the fourth intra-confine coupling 116(4), as detected by the first living room node 112(2A), with a given fourth intra-confine signal plane 202. A location for the locomotive object may be determined, by the monitor 114, based on the intersecting planes, as associated with changes in the signal properties for the fourth intra-confine coupling 116(4) and fifth intra-confine coupling 116(5), at a given time. The above principles may also be used with respect to inter-confine couplings. As more nodes 112 and couplings 116/117 are utilized within a given environment 100 greater precision in both motion detection and location determination, for a locomotive object, may be realized. For at least one implementation, a given environment may include at least three couplings covering a given confine area 110. The given confine area 110 may include any given area, and/or volume in a physical space.

Figure 3:
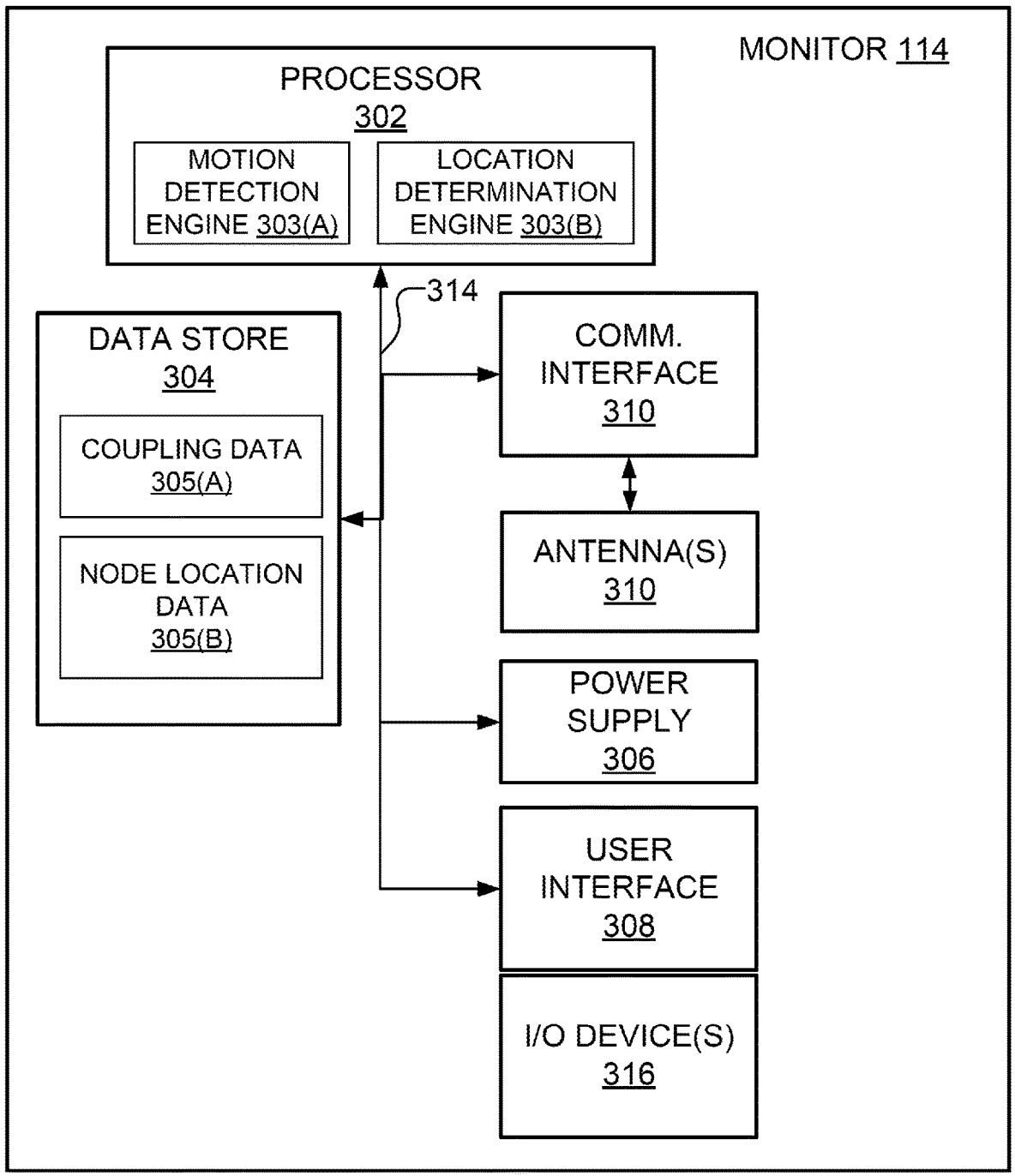
FIG. 3 is schematic representation of a monitor for at least one implementation of the present disclosure.

As shown in FIG. 3 for at least one implementation of the present disclosure, a monitor 114 may include: a monitor processor 302 configured to instantiate a motion detection engine 303(A) and, optionally, a location determination engine 303(B); a monitor data store 304 storing at least instructions for instantiating the motion detection engine 303(A) and the location determination engine 303(B), coupling data 305(A), node location data 305(B), and other data and instructions; a monitor power supply 306; a monitor user interface 308; a monitor communications interface 310; one or more monitor antennas 312; a monitor data bus 314;

and one or monitor input/output ("I/O") devices 316. For at least one implementation, the monitor 114 may have one of various forms of computing devices, with non-limiting examples including smartphones, tablet computing devices, laptop computers, digital cameras, and the like.

The monitor 114 may include a monitor processor 302 (herein, also identified as a "monitor CPU"). Any known or later arising processor may be used. The monitor processor 302 may be provided by a processing device capable facilitating one or more logics by executing one more computer instructions with respect to data. The motion detection engine ("MDE") 303(A) and location determination engine ("LDE") 303(B) may be executed by one or more threads on the monitor processor 302, or otherwise. The monitor processor 302 may include one or more physical components configured for such data processing operations. Any known or later arising technologies may be utilized in conjunction with an implementation of the present disclosure to facilitate the monitor processor 302, the MDE 303(A) and the LDE 303(B).

The monitor 114 may instantiate one or more computer engines as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. The monitor 114 may be provided in the virtual domain and/or in the physical domain. The monitor 114 may be associated with a human user, a machine process executing on one or more computing devices, an API, a web service, instantiated on the Cloud, distributed across multiple computing devices, or otherwise. The monitor 114 may be any electronic device configurable to communicate data using a network, directly or indirectly, to another device, to another monitor, or otherwise.

The monitor processor 302 may be communicatively coupled, by a monitor data bus 314 or similar structure, to other components of the monitor 114 including, but not limited to, a monitor data store 304, which may also be referred to as a "computer readable storage medium."

MDE 303(A)

Figure 4:
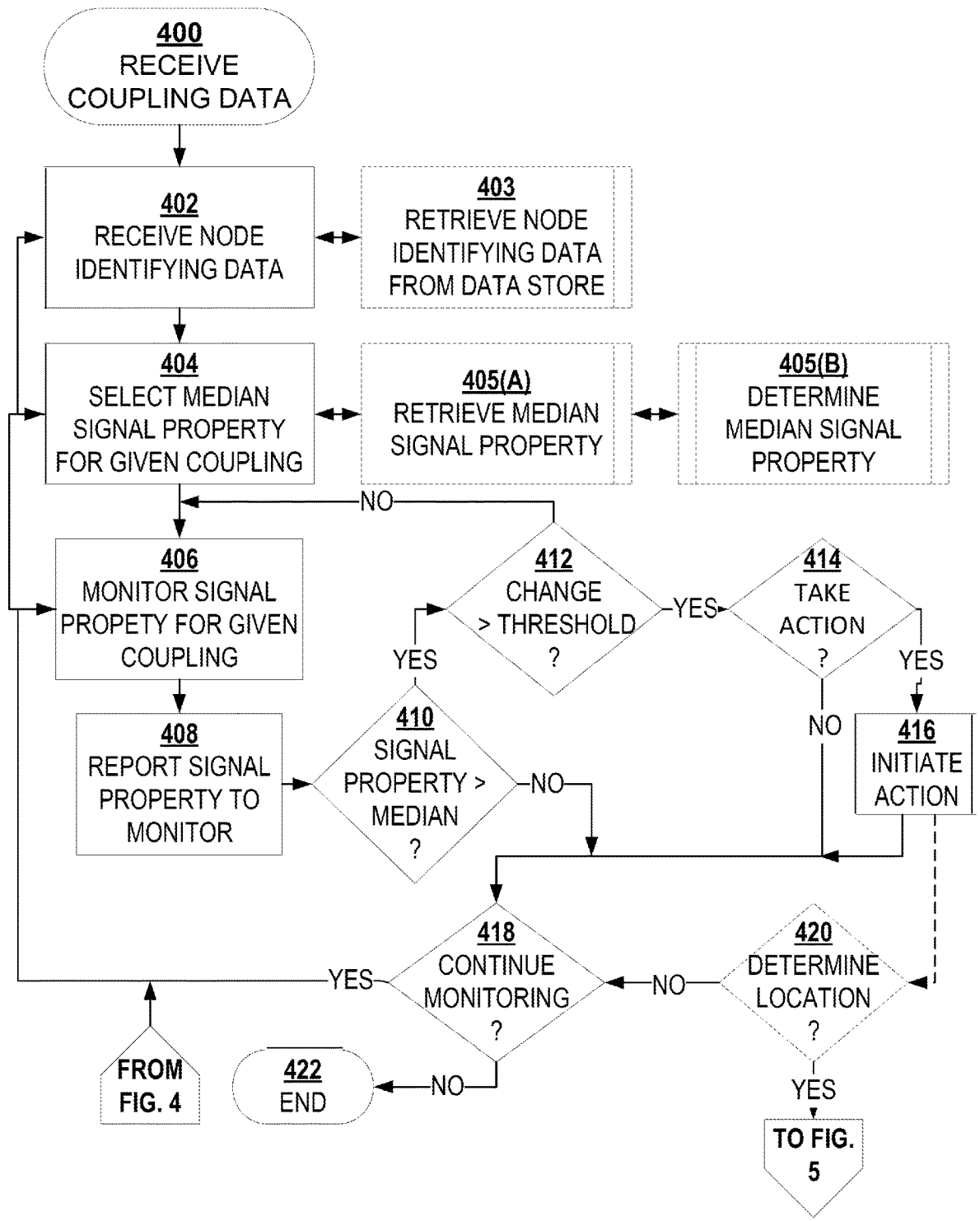
FIG. 4 is flow chart illustrating operations performed by a motion detection engine and in accordance with at least one implementation of the present disclosure.

With reference to FIGS. 3 and 4, the MDE 303(A) facilitates detection of motion by locomotory objects 118 based upon a change in one or more signal properties for one or more couplings between two or more nodes 112 and/or nodes 112 with one or more monitors 114, and within an environment 100.

For at least one implementation, operations of the MDE 303(A) are illustrated in FIG. 4 (and further described below). Such operations are non-limiting and for at least one implementation of the present disclosure. Other operations, sequences thereof, combinations, and/or permutations thereof may be used in accordance with other implementations of the present disclosure. For at least one implementation, the MDE 303(A) may be instantiated, in whole, in part, and/or in various permutations and combinations, in a node 112, a monitor 114, a network connected server, or otherwise and where one corresponding system components includes a processor configured to provide one or more features and functions of the MDE 303(A).

LDE 303(B)

Figure 5:
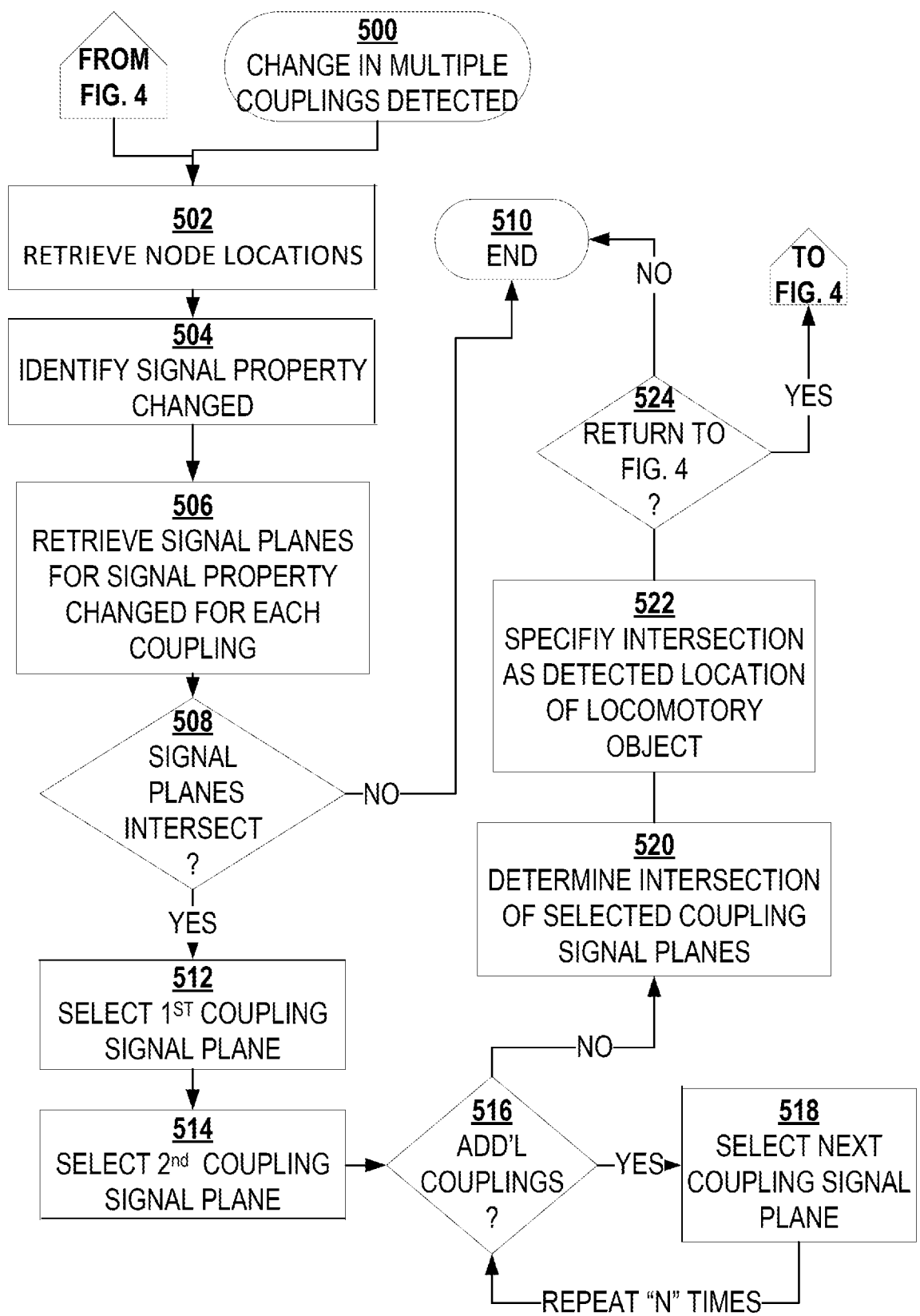
FIG. 5 is flow chart illustrating operations performed by a location detection engine and in accordance with at least one implementation of the present disclosure.

With reference to FIGS. 3 and 5, the LDE 303(B) facilitates location determinations for locomotory objects 118 based upon a change in one or more signal properties for two or more couplings between to three or more nodes 112 and/or the monitor 114 and within an environment 100.

For at least one implementation, operations of the LDE 303(B) are illustrated in FIG. 5 (and further described below). Such operations are non-limiting and for at least one implementation of the present disclosure. Other operations, sequences thereof, combinations, and/or permutations thereof may be used in accordance with other implementations of the present disclosure. For at least one implementation, the LDE 303(B) may be instantiated, in whole, in part, and/or in various permutations and combinations, in a node 112, a monitor 114, a network connected server, or otherwise and where one corresponding system components includes a processor configured to provide one or more features and functions of the LDE 303(B).

Monitor Data Store 304

The monitor data store 304 may be a storage, multiple storages, or otherwise. The monitor data store 304 may be configured to store one or more instances of coupling data 305(A), node location data 305(B), and other data and instructions. The monitor data store 304 may be provided locally with the monitor 114 or remotely, such as by a data storage service provided on the Cloud, and/or otherwise. Storage of data may be managed by a storage controller (not shown) or similar component. It is to be appreciated such storage controller manages the storing of data and may be instantiated in one or more of the monitor data store 304, the monitor processor 302, on the Cloud, or otherwise. Any known or later arising storage technologies may be utilized in conjunction with an implementation of the present disclosure to facilitate the monitor data store 304.

Any known or later arising storage technologies may be utilized for the monitor data store 304. Non-limiting examples of devices that may be configured for use as monitor data store 304 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the monitor data store 304 may be partitioned or otherwise designated by the storage controller as providing for permanent storage and temporary storage. Non-transient data, computer instructions, or other the like may be suitably stored in the monitor data store 304. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

Coupling data 305(A) may include data identifying one or more intra-confine couplings 116 and/or inter-confine couplings 117 between a first node and one or more second nodes and/or monitor(s). The coupling data 305(A) may include data identifying one or more signal properties of a given coupling, historical use, use trends, known issues (such as when a signal property changes due to environmental or other, non-locomotory object influences, and otherwise. Coupling data 305(A) may include, for a non-limiting example, average signal strengths of a wireless signal for a given coupling, or the like.

Node location data 305(B) may include data identifying a location of a given node. When a node is mobile, the node location data 305(B) may include data identifying a last known location of the node. Node location data 305(B) may include data identifying one or more coupling signal planes, such as the fifth intra-confine coupling signal planes illustrated in FIG. 2. Node location data 305(B) may include any data useful in determining a past, current, and/or predicted future location of a locomotory object 118 based upon one or changes in one or more signal properties for one or more intra-confine couplings 116 and/or inter-confine couplings 117.

Monitor Power Supply 306

The monitor 114 may include a monitor power supply 306. The monitor power supply 306 may include any known or later arising technologies which facilitate the use of electrical energy by the monitor 114. Non-limiting examples of such technologies include batteries, power converters, inductive charging components, line-power components, solar power components, and otherwise.

Monitor User Interface 308

The monitor 114 may include a monitor user interface 308. The monitor user interface 308 may include any known or later arising human to device interface components, processes, and technologies. Non-limiting examples of interface components include those configured for use with audible, visible, and other forms of I/O device 316.

I/O Devices 316

The I/O devices 316 may include any known or later arising human to device interface components, processes, and technologies. Non-limiting examples of interface components include audible input/output ("I/O") interfaces for use with audio I/O devices, visual I/O interfaces for use with visual I/O devices, and other I/O devices.

For at least one implementation, an audio I/O interface may support a receiving and/or presenting of audible content. Such audible content (which is also referred to herein as being "audible signals") may include spoken text, sounds, or any other audible information. Such audible signals may include one or more of humanly perceptible audio signals, where humanly perceptible audio signals typically arise between 20 Hz and 20 KHz. The range of humanly perceptible audio signals may be configurable to support an audible range of a given individual user.

An audio I/O interface generally includes hardware and computer instructions (herein, "audio technologies") which supports the input and output of audible signals between a user and a device. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise.

An audio I/O interface may use one or more microphones and speakers to capture and present audible signals respectively from and to a user. Such one or more microphones and speakers may be provided. For example, earbuds may be communicatively coupled to a smartphone, with the earbuds functioning as an audio I/O interface and capturing and presenting audio signals as sound waves to and from a user.

A visual I/O interface generally includes hardware and computer instructions (herein, "visible technologies") which supports the input by and output of visible signals to a user. Such visible technologies may include, but are not limited to, a camera (not shown), a user device display (not shown), and/or other devices and technologies for converting data into humanly perceptible information.

A visual I/O interface may be configured to use one or more visual I/O devices. A user device display (not shown) may be an internal display (not shown) and/or external display (not shown), that are configured to present visible data, and other data to a user. A visual I/O interface may be configured to use one or more image capture devices. Non-limiting examples include lenses, digital image capture and processing software and the like. Accordingly, it is to be appreciated that any existing or future arising visual I/O interfaces, devices, systems and/or components may be utilized.

Other forms of I/O devices may be provided with and/or coupled to the monitor 114. Non-limiting examples include keypads, touch screens, styluses, external keyboards, or the like. Any form of known or later arising I/O device(s) may be utilized with a monitor 114 for at least one implementation of the present disclosure.

Monitor Communications Interface 310

The monitor 114 may include a monitor communications interface 310. The monitor communications interface 310 may be configured to use any known or later arising communications and/or networking technologies which facilitate coupling of the monitor 114 to nodes 112, other monitors 114, networked components such as web servers, or otherwise. One or more data ports (not shown) (which are also commonly referred to an input/output interfaces, cards, or the like) may be used to facilitate coupling of the monitor 114 with one or more other system components. Such communication interfaces are well-known in the art and non-limiting examples include Ethernet cards, USB and storage medium interface cards, radio frequency transceivers, and others. For at least one implementation, the monitor communications interface 310 may be configured to couple with one or more antennas 312. Any known or later arising antenna 312 may be used in an implementation of the present disclosure to couple a monitor 114 with a node 112, a web server (not shown), or otherwise.

As shown in FIG. 4, a process for detecting motion for at least one implementation of the present disclosure may include non-transient computer executable instructions, that when executed by the monitor processor 302 instantiated a motion detection engine 303(A) which instructs the monitor 114 to perform various electronic device operable operations.

As shown by Operation 400, the process may include receiving coupling data indicative of a given coupling being formed between a first node and a second node. The coupling may be an intra-confine coupling or an inter-confine coupling.

As shown by Operation 402, the process may include receiving node identifying data. The node identifying data may identify one or more capabilities of a given node. Non-limiting examples of capabilities of a given node include capabilities provided by smart devices, such as smart thermostats, smart light bulbs, smart alarm systems, smart doorbells, smart locks, smart appliances, such as refrigerators, ovens, coffee makers; and any other device capable of wirelessly communicating data by and between another node or monitor on a given network. The given network may include mesh networks and other network configurations.

As shown by Operation 403, the process may additionally and/or alternatively include retrieving node identifying data from the monitor data store 304 node. Such node identifying data may be provided in the coupling data 305(A), node location data 305(B), or other data records stored by the monitor data store 304.

As shown by Operation 404, the process may include selecting at least one "median signal property" for the given coupling. As used herein, a "median signal property" is a median value of a given signal property arising over a given period, e.g., during a day, week, month, year, portion of a day, such as during daylight hours, or otherwise. A median signal property may be updated continually, periodically, fixed, determined based on testing, or otherwise. For example, a median signal strength of a given coupling during daylight hours may be selected. Any signal property and the median thereof, for a given period, may be selected per Operation 404.

As shown by Operation 405(A), the operation of selecting the median signal property may include retrieving the median signal property from a database, such as coupling data 305(A) stored in the data store, or from another data store, such as one that may be Cloud based or otherwise.

As shown by Operation 405(B), the operation of selecting the median signal property may include signal monitoring operations performed by one or more nodes 112 forming the given coupling and the monitor 114. Such signal monitoring operations may include capturing readings, by one or more of the nodes 112 coupled by a given coupling, of the one or more monitored signal properties for the given coupling. The readings of the signal property(s) may be accomplished using any known or later arising signal monitoring technologies. The node(s) 112 may report such readings to the monitor 114. The node(s) 112 and/or the monitor 114 may determine, from the readings, an average, median, or other statistical parameter for the one or more monitored signal properties and over a given period. The reporting of the readings by the node(s) 112 to the monitor 114 may occur using an intra-confine coupling 116, an inter-confine coupling 117, a physical data transfer (e.g., by transfer of a flash media drive), using other couplings, or otherwise.

As shown by Operation 406, the process may include monitoring the at least one signal property for the given coupling. Such monitoring may occur by a monitor, a node, both, and otherwise. Such monitoring may occur on any basis, such as continually, on a schedule, randomly, or otherwise. For at least one implementation where the given nodes 112 for a given coupling 116/117 are continually powered (e.g., by line power), Operation 406 may be performed on a continual basis. For another implementation where one or more of the given nodes 112 for the given coupling 116/17 are battery powered or intermittently powered, Operation 406 may be performed on an a given basis.

As shown by Operation 408, the process may include periodically reporting by a node and receiving, by a monitor, signal properties for the given signal properties in a given coupling. The reporting may occur on any basis, such as when detected, periodically, or otherwise.

As shown by Operation 410, the process may include determining whether a signal property is greater than the median. For at least one implementation, Operations 408 and 410 may be performed by a node 112 with changes in signal properties reported to the monitor 114 on an occurrence basis. For another implementation, the monitor 114 may determine whether a signal property has changed, as such signal property is reported to the monitor 114 per Operation 408.

As shown by Operation 412, the process may include determining, by the monitor 114 (and/or for at least one implementation, by a node 112), whether the detected change in the signal property exceeds a given threshold. The given threshold may be specified by a system install, based on actual use data, specified in view of types of locomotory objects 118 in the environment, such as humans, pets and robots, and otherwise. The given threshold may be exceeded positively (e.g., as represented by an increase in a given signal property as may occur due to a presence of an interfering signal property for the given coupling) or negatively (e.g., as represented by a decrease in a given signal property, as may occur in a signal strength that reduces when a locomotory object 118 intercepts the given coupling). If the given threshold is not exceeded, the process may continue with Operation 406. If the given threshold is exceeded, the process may continue with Operation 414.

For at least one implementation, Operations 408 to 412 may be performed based on detected changes in a single signal property for a given coupling, e.g., a signal strength for the given coupling, and/or in based on detected changes in two or more signal properties for the given coupling (e.g., a change in a signal strength as well as a change in a signal to noise ratio), and/or in view of changes to one or more signal properties in two or more couplings (e.g., a momentary change in the first intra-confine coupling 116(1) followed within a given period by a change in the second intra-confine coupling 116(2)—such successive changes being representative of a locomotory object 118 proceeding through the first confine area 110(1) (the hall in this example).

As shown by Operation 414, the process may include determining whether an action (if any) is to be performed in view of the detected changes in the one or more signal properties for one or more couplings. If action is not to be taken, the process may proceed to Operation 418. If action is to be taken, the process may proceed to Operation 416.

As shown by Operation 416, the monitor 114 may be configured to determine whether to act in response to one or more changes in a signal property for one or more couplings based upon one or more rule sets specifying a pattern of behavior for one or more locomotory objects 118. The rule sets may be user specified, default, predetermined, determined using artificial intelligence and know machine learning instructions, or otherwise.

For a non-limiting example, a pattern of behavior rule may specify that when a change in a signal property for a given coupling in a bedroom, at night, and where the given coupling is not parallel to, adjacent to, or otherwise covers a primary egress, activation of an alarm system, or other action, is not to be requested by the monitor 114—such pattern of behavior being representative of a locomotory object 118 proceeding to a restroom or other interior location for the environment 100. Similarly, a pattern of behavior rule may specify that when the detected change in the signal property is for a given coupling that covers a primary egress and the detected change occurs during one or more given periods (e.g., during sleeping hours, during working hours, or otherwise), a request by the monitor 114 for activation of an alarm or other action is to be performed. The activation of such alarm or other action being performed by other systems for a given environment and the activation and/or operation of such other actions being any known or later arising technologies that facilitate such action(s).

For another non-limiting example, a pattern of behavior rule may provide an adaptive environment, wherein an adaptive environment is one that based upon previous patterns of behavior, as determined for example, based upon machine learning and interactions by locomotive objects with smart devices within an environment, pre-emptive actions are taken based upon detected changes in one or more signal properties for one or more couplings. For example, the monitor 114 may be configured to request other environment systems, such as lights, televisions, and other devices to activate/deactivate/or adjust one or more settings thereof based upon detected changes in one or more signal properties. For example, lights in a given confine 106 may be activated as a locomotory object 118 approaches the confine 106. Further, devices (e.g., a television) may be activated or deactivated (as the case may be) when the locomotory object 118 enters or exists a confine area 110 (e.g., a confine area encompassing a couch positioned in front of a television, a coffee maker in a kitchen being activated when the locomotive object awakes and begins proceeding towards the kitchen, and the like). The monitor 114 may be configured to, directly or indirectly, control activation/deactivation and/or other changes in device status within an environment in response to detected changes in one or more signal properties for one or more couplings 116/117.

As shown by Operation 418, the process may include variously determining whether monitoring of a given signal property and/or multiple signal properties for a given coupling and/or multiple couplings is to continue. As shown for at least one implementation, Operation 418 may be performed after Operation 408, 414, and 416. For other implementations, Operation 418 may be performed at any time. If monitoring is to continue, the process may continue at one or more of Operations 402, 404, 406. If monitoring is not to continue, the process may end, as per Operation 422.

As shown by Operation 420, the process may include determining whether location of a locomotory object is to occur. Operation 420 may occur at any time and is shown as occurring after Operation 416 for purposes of drawing clarity. If location determination is to be performed, one or more location determination Operations, with one example of such Operations being illustrated by FIG. 5, may be performed. Otherwise, the process may continue with Operation 418.

As shown in FIG. 5, a process for determining a location of a locomotory object may begin upon a request arising from the Operations of FIG. 4 and/or, as shown by Operation 500, independently upon a detection of changes in one or more signal properties for two or more couplings. Operation 500 may occur when the changes occur within a given period, such as substantially simultaneously and example of which may include changes detected as occurring within 0.5 msec (?)

As shown by Operation 502, the process may include retrieving locations for the nodes 112 forming the given couplings in which a change in a signal property has been detected. As discussed above, at least two couplings are used to determine a location of a locomotory object based upon changes in a signal properties for a given coupling.

As shown by Operation 504, the process may include identifying the one or more signal properties changed.

As shown by Operation 506, the process may include retrieving signal planes for the one or more changed signal properties for the two or more couplings.

As shown by Operation 508, the process may include determining whether the signal planes intersect and/or otherwise overlap (herein, individually and collectively "intersects"). If the signal planes do not intersect, the process proceeds to Operation 510. If the signal planes intersect, the process proceeds to Operation 512.

As shown by Operation 510, if the signal planes for the one or more signal properties in the two or more couplings do not intersect, the process ends. Such a scenario may occur, for example, based upon substantially simultaneous changes in signal properties by two or more locomotory objects in different confines 106, or otherwise.

As shown by Operation 512, the process may include selecting a first signal plane, associated with a first node and for a given first coupling, based upon a first signal property for the first coupling. As discussed above and for at least one implementation, one or more signal planes (which may be spheres, vectors, or the like, as generated based on a given antenna design used for a given coupling), may be virtualized to exist for a given node and a given coupling. The one or more signal planes may be associated with a given signal property for the given coupling and at a given distance. For example, a signal strength, or other signal property, for a given coupling, as sensed by a given node, may occur at a given level when a locomotory object 118 intersects with the given coupling at substantially a first distance and may be different at a second distance. For example, when a locomotory object is 1 meter from a given node, the signal strength for a given coupling, as detected by the give node may be at a level "S" and when the locomotory object is 10 meters from the given node, the signal strength may be ($\frac{1}{10}$)*S (one-tenth of S); where S may be a value, a range or otherwise.

As shown by Operation 514, the process may include selecting a second signal plane, associated with the first node and for a given second coupling, based upon a second signal property for the second coupling. The first signal property and the second signal property may be the same or different.

As shown by Operation 516, the process may include determining whether additional couplings are to be used to identify the location of a locomotory object. If yes, the process continues in parallel, serially, iteratively, or otherwise with Operations 518 and Operation 516 until a given number of additional coupling signal planes are selected. When a given number (if any) of additional coupling signal planes have been selected, the process proceeds to Operation 520. The number of additional coupling signal planes selected may vary based on detected changes in signal properties for couplings, based upon a degree of positional accuracy for a given location determination, based upon distances between nodes, and otherwise.

As shown by Operation 520, the process may include determining whether and where the selected coupling signal planes intersect. It is to be appreciated that as the number of coupling signal planes selected (per Operations 512-518) increases, an area and/or a location within such area, in two-dimensional (2D), three-dimensional (3D) and/or four dimensional (4D) space (where 4D space identifies coupling signal planes that intersect at varying times, as may occur for a moving locomotory object 118), within which the locomotory object is present at a given time or over a given period may be more precisely estimated.

As shown by Operation 522, the process may include specifying an intersection, which may include an area or a given location within 2D, 3D and/or 4D space, of the two or more selected coupling signal planes as a detected location of a given locomotory object 118. The specification may be output by the monitor 114 for any given use thereof, such as surveillance, alarm reporting, providing an adaptive environment, or otherwise.

As shown by Operation 524, the process may include determining whether a return to Operations illustrated by FIG. 4 is to occur. If so, the process may return to FIG. 4 at any given operation therein. If not the process may end, as per Operation 510.

It is to be appreciated that the operations described herein and illustrated in FIGS. 4 and 5 provide one sequence of operations for a given implementation of the present disclosure. The sequence of operations may vary for other implementations and one or more operations may be repeated, not performed, performed in different orders or otherwise.

Herein, various confines, confine areas, nodes, and the like have been referred to using the label "[room] . . ." or the like, such as "living room node," where [room] refers to a given confine such as a living room, hall, garage, or the like. It is to be appreciated that the adjective [room] is used herein for purposes of explanation and may refer, in any given implementation of the present disclosure, to any logically, physically, or otherwise definable geographic space in time, including in a past time, a current time and/or in a future time.

Although various implementations have been described above with a certain degree of particularity, or with reference to one or more individual implementations, those skilled in the art could make numerous alterations to the disclosed implementations without departing from the spirit or scope hereof. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and links may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of the present disclosure as defined in the following claims.

What is claimed is:

1. A process, for detecting motion within an environment, comprising:
   receiving, at a monitor, first coupling data for a first wireless coupling of a first node with a second node;
      wherein the first node is coupled to the second node;
      wherein the second node is coupled to the monitor; and
      wherein the first node, the second node and the monitor form a mesh network;
   receiving, at the monitor, first node identifying data for the first node;
      wherein the first node identifying data identifies a signal processing capability of the first node;
   selecting, at the monitor, a first median for a first signal property for a first wireless coupling of the first node with another node;
   monitoring the first signal property for the first wireless coupling;
   determining, at the monitor, based upon detecting a change in the first signal property and the signal processing capability of the first node, whether the first signal property exceeds the first median;
   determining, at the monitor, when the first signal property exceeds the first median, if the change in the first signal property exceeds a first threshold;
      initiating, by the monitor, a first action when the first threshold is exceeded; and
      determining, by the monitor, whether to resume monitoring of the first signal property when the first threshold is not exceeded.

2. The process of claim 1,
   wherein the first node is a smart device.

3. The process of claim 1,
   wherein the first signal property is a signal strength for the first wireless coupling.

4. The process of claim 1,
   wherein the first median for the first signal property is selected by retrieving the first median from a data store storing a plurality of past readings for the first signal property.

5. The process of claim 1,
   wherein the first median for the first signal property is determined by monitoring the first wireless coupling over a given period and calculating the first median based upon results of the monitoring.

6. The process of claim 1,
   wherein the first signal property is monitored by the first node and reported to the monitor.

7. The process of claim 1,
   wherein the first threshold is exceeded based upon a presence of an interfering signal in the environment.

8. The process of claim 1,
   wherein the first threshold is exceeded when the first signal property decreases below the median by more than a given number.

9. The process of claim 8,
   wherein the given number is specified in view of one or more types of locomotory objects within the environment; and
   wherein the types of locomotory objects include at least one of humans, animals, and robots.

10. The process of claim 1,
    wherein the first action comprises providing an adaptive environment.

11. The process of claim 1,
    wherein the first node is located within a first confine of an environment;
    wherein the second node is located with the first confine of the environment;
    wherein the first coupling in an intra-confine coupling;
    wherein the monitor is located with a second confine of the environment; and
    wherein the monitor is coupled to the second node by an inter-confine coupling.

12. The process of claim 11,
    wherein the environment is a home and the first confine is a room within the home.

13. The process of claim 11 further comprising:
    determining a location of a locomotory object within the environment by:

receiving changes in a second signal property for at least one second coupling between nodes within the environment.

14. A process, for detecting motion within an environment, comprising:
   receiving, at a monitor, first coupling data for a first wireless coupling of a first node with a second node; wherein the first node is coupled to the second node; wherein the second node is coupled to the monitor; and wherein the first node, the second node and the monitor form a mesh network;
   receiving, at the monitor, first node identifying data for the first node;
   selecting, at the monitor, a first median for a first signal property for a first wireless coupling;
   monitoring the first signal property;
   determining, upon detecting a change in the first signal property, whether the first signal property exceeds the first median;
   determining, when the first signal property exceeds the first median, if the change in the first signal property exceeds a first threshold;
   initiating a first action when the first threshold is exceeded;
   determining whether to resume monitoring of the first signal property when the first threshold is not exceeded;
   determining a location of a locomotory object within an environment by:
      receiving changes in a second signal property for at least one second coupling between nodes within the environment;
      retrieving one or more first coupling signal planes for the first coupling;
      retrieving one or more second coupling signal planes for the second coupling;
      determining whether any of the retrieved one or more first coupling signal planes intersect the retrieved one or more second coupling signal planes;
      when at least one of one or more retrieved first coupling signal planes intersect with at least one of the one or more retrieved second coupling signal planes,
         selecting a first coupling signal plane from the one or more intersecting first coupling signal planes;
         selecting a second coupling signal plane from the one or more intersecting second coupling signal planes;
         determining an intersection between the selected first coupling signal plane and the selected second coupling signal plane; and
         identifying the intersection as a location of a locomotory object.

15. The process of claim 14, wherein the intersection is a two-dimensional space within the environment.

16. The process of claim 14, wherein the environment includes a third coupling between one of:
   the first node and a third node;
   the second node and the third node;
   the first node and the monitor; and
   the third node and the monitor.

17. The process of claim 16, further comprising:
retrieving one or more third coupling signal planes for the third coupling;
determining whether one or more of the first coupling signal planes or second coupling signal planes intersect with the third coupling signal planes;
when at least one of one or more first coupling signal planes or second coupling signal planes intersect with at least one of the one or more third coupling signal planes,
   selecting a third coupling signal plane from the one or more intersecting third coupling signal planes;
   determining a second intersection between the, as selected, first coupling signal plane, the, as selected, second coupling signal plane, and the, as selected, third coupling signal plane; and
identifying the second intersection as a second location of the locomotory object.

18. The process of claim 17, wherein the second location is defined in terms of a three-dimensional space and within the environment.

19. The process of claim 18, wherein the monitor initiates an action based on at least one of the identifying of the first intersection and the second intersection.

* * * * *